United States Patent
Bendigeri et al.

(10) Patent No.: US 11,153,186 B2
(45) Date of Patent: Oct. 19, 2021

(54) ADAPTIVE NETWORK SELECTION

(71) Applicant: Dell Products, L.P., Round Rock, TX (US)

(72) Inventors: Udaya Surendra Bendigeri, Austin, TX (US); Kamal Joseph Koshy, Austin, TX (US); Dileep Kumar Soma, Austin, TX (US); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 74 days.

(21) Appl. No.: 16/774,517

(22) Filed: Jan. 28, 2020

(65) Prior Publication Data
US 2021/0234778 A1    Jul. 29, 2021

(51) Int. Cl.
| | |
|---|---|
| *H04W 88/06* | (2009.01) |
| *H04L 12/26* | (2006.01) |
| *H04L 29/06* | (2006.01) |
| *H04W 48/18* | (2009.01) |
| *H04W 48/16* | (2009.01) |

(52) U.S. Cl.
CPC ...... *H04L 43/0811* (2013.01); *H04L 43/0882* (2013.01); *H04L 69/14* (2013.01); *H04L 69/24* (2013.01); *H04W 48/16* (2013.01); *H04W 48/18* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 2012/0002595 | A1* | 1/2012 | Mao | H04B 17/309 370/315 |
| 2013/0078994 | A1* | 3/2013 | Jouin | G06F 3/041 455/426.1 |
| 2014/0092828 | A1* | 4/2014 | Sirotkin | H04J 3/1694 370/329 |
| 2015/0237554 | A1* | 8/2015 | Craig | H04W 36/0069 370/332 |
| 2018/0084562 | A1* | 3/2018 | Ramamurthi | H04B 17/309 |
| 2018/0376401 | A1* | 12/2018 | Karimli | H04W 36/0022 |
| 2019/0014024 | A1  | 1/2019 | Koshy | |
| 2019/0200283 | A1* | 6/2019 | Graybeal | H04W 12/50 |

(Continued)

OTHER PUBLICATIONS

Z. Weng, et al., "Classification of Wireless Interference on 2.4GHz Spectrum," TR2014-018, Apr. 2014, 8 pages, Mitsubishi Electric Research Laboratories, Inc., Cambridge, Massachusetts, USA.

*Primary Examiner* — Ajit Patel
(74) *Attorney, Agent, or Firm* — Fogarty LLP

(57) ABSTRACT

Systems and methods for adaptive network selection are described. In some embodiments, an Information Handling System (IHS) may include a processor and a memory coupled to the processor, the memory having program instructions stored thereon that, upon execution, cause the IHS to: receive link capabilities for each of a plurality of communication links available to the IHS; receive link requirements for each of a plurality of applications executed by the IHS; and assign at least one of the plurality of applications to at least one of the plurality of communication links, at least in part, by matching a subset of link requirements to a subset of link capabilities.

13 Claims, 5 Drawing Sheets

(56) References Cited

U.S. PATENT DOCUMENTS

| | | | |
|---|---|---|---|
| 2019/0245810 A1 | 8/2019 | Gulbay et al. | |
| 2019/0387382 A1* | 12/2019 | Wojcieszak | H04W 72/1215 |
| 2020/0128415 A1* | 4/2020 | Venkataraman | H04L 43/16 |
| 2020/0280827 A1* | 9/2020 | Fechtel | H04W 4/46 |

* cited by examiner

ADAPTIVE NETWORK SELECTION

FIELD

This disclosure relates generally to Information Handling Systems (IHSs), and more specifically, to systems and methods for adaptive network selection.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs often communicate through networks to perform processing tasks. Generally, client IHSs establish communication through a network to a server IHS to retrieve and store information. Different types of networks support different types of communication at different data transfer rates. For example, a conventional client IHS may communicate with a local area network (LAN) through a wired Ethernet communication, such as through a CAT 5 cable, through a USB or other serial cable, or through a variety of wireless communication protocols, such as a wireless local area network (WLAN) or a wireless wide area network (WWAN). In an enterprise or residential network, client IHSs access networks through access points, such as with wireless or Ethernet interfaces (e.g., an Internet router interface).

Typically, applications executing on a client IHS use a single network interface to communicate with external networks. For example, an Internet browser executing on a client IHS establishes a network interface through a WLAN and uses the WLAN for communication with the network. Although other types of network interfaces are available, such as an Ethernet LAN interface or a WWAN interface, the application relies upon only one network interface to communicate with an external network.

Other applications may support multiple network interfaces. In those cases, network traffic is divided by application so that a selected application, such as a game that uses network communication, has all of the bandwidth of one network interface available, such as an Ethernet interface, while other applications share a separate network interface, such as a WLAN. These applications effectively increase network bandwidth at a client IHS by allowing simultaneous connections over multiple links.

In a corporate environment, there may be multiple applications running on a single IHS, each application having different requirements of network connectivity for a seamless user experience. As the inventors hereof have recognized, however, conventional network selection algorithms are static, based purely on load or congestion metrics, etc., and do not update network selection(s) continuously to match application usage statistics with Access Point (AP) attributes and/or context. To address these, and other problems, the inventors hereof have developed systems and methods for adaptive network selection.

SUMMARY

Embodiments of systems and methods for adaptive network selection are described. In an illustrative, non-limiting embodiment, an Information Handling System (IHS) may include a processor and a memory coupled to the processor, the memory having program instructions stored thereon that, upon execution, cause the IHS to: receive link capabilities for each of a plurality of communication links available to the IHS; receive link requirements for each of a plurality of applications executed by the IHS; and assign at least one of the plurality of applications to at least one of the plurality of communication links, at least in part, by matching a subset of link requirements to a subset of link capabilities.

For example, link capabilities may include latency and throughput capabilities, and the link requirements may include latency and throughput requirements. Two or more of the plurality of communication links may be provided by different access points. To assign at least one of the plurality of applications to at least one of the plurality of communication links, the program instructions, upon execution, may cause the IHS to: determine that a first application has a higher priority than a second application; and select a first one of the plurality of communication links that has first link capabilities most closely matching first link requirements of the first application prior to selecting a second one of the plurality of communication links that has second link capabilities most closely matching second link requirements of the second application.

To select the first communication link, the program instructions, upon execution, may cause the IHS to determine that two or more of the plurality of communication links have latencies that satisfy a latency requirement of the first application, where the first communication link is selected as one of the two or more communication links with lowest latency capability. Additionally, or alternatively, to select the first communication link, the program instructions, upon execution, may cause the IHS to determine that two or more of the plurality of communication links have latencies that satisfy a latency requirement of the first application, where the first communication link is selected as one of the two or more communication links with highest throughput capability.

The program instructions, upon execution, may cause the IHS to detect a change in the first link requirements and, in response to the detection, select another one of the plurality of communication links that has link capabilities most closely matching the changed link requirements. Additionally, or alternatively, the program instructions, upon execution, may cause the IHS to detect a change in the first link capabilities and, in response to the detection, select another one of the plurality of communication links that has link capabilities most closely matching the first link requirements.

To match the subset of link requirements to the subset of link capabilities, the program instructions, upon execution, may cause the IHS to: receive context information; and adjust the subset of link requirements based upon the context information prior to the matching. The context information may include a distance between a user and the IHS, and the program instructions, upon execution, may cause the IHS to: in response to the distance being smaller than a selected value, reduce a value of a link requirement; or in response to the distance being greater than the selected value, increase the value of the link requirement. Additionally, or alternatively, the context information may include a distance between a user and the IHS, and wherein the program instructions, upon execution by the processor, further cause the IHS to: in response to the distance being smaller than a selected value, increase a value of a link requirement; or in response to the distance being greater than the selected value, reduce the value of the link requirement.

Additionally, or alternatively, the context information may include a posture of the IHS, and wherein the program instructions, upon execution, may cause the IHS to: in response to the posture being a first posture, reduce a value of a link requirement; or in response to the posture being a second posture, increase the value of the link requirement.

In another illustrative, non-limiting embodiment, a memory device may have program instructions stored thereon that, upon execution by a processor of an IHS, cause the IHS to: receive link capabilities for each of a plurality of communication links available to the IHS; receive link requirements for each of a plurality of applications executed by the IHS; and assign at least one of the plurality of applications to at least one of the plurality of communication links, at least in part, by matching a subset of link requirements to a subset of link capabilities.

The program instructions, upon execution, may also cause the IHS to: in response to a distance between a user and the IHS being smaller than a selected value, reduce a value of a link requirement; or in response to the distance being greater than the selected value, increase the value of the link requirement.

Additionally, or alternatively, the program instructions, upon execution by the processor, further cause the IHS to: in response to a distance between a user and the IHS being smaller than a selected value, increase a value of a link requirement; or in response to the distance being greater than the selected value, reduce the value of the link requirement. Additionally, or alternatively, the program instructions, upon execution by the processor, further cause the IHS to: in response to the IHS being in a first posture, reduce a value of a link requirement; or in response to the IHS being in a second posture, increase the value of the link requirement.

In yet another illustrative, non-limiting embodiment, a method may include receiving link capabilities for each of a plurality of communication links available to an IHS; receiving link requirements for each of a plurality of applications executed by the IHS; and assigning at least one of the plurality of applications to at least one of the plurality of communication links, at least in part, by matching a subset of link requirements to a subset of link capabilities. In response to a distance between a user and the IHS being smaller or greater than a selected value, the method may further include changing a value of a link requirement.

Additionally, or alternatively, the method may include: in response to an angle of an IHS hinge being smaller than a selected value, reducing a value of a link requirement; or in response to the angle being greater than the selected value, increasing the value of the link requirement. Additionally, or alternatively, the method of claim 17 may include: in response to an angle of an IHS hinge being smaller than a selected value, increasing a value of a link requirement; or in response to the angle being greater than the selected value, reducing the value of the link requirement.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Systems and methods for adaptive network selection are described. In various embodiments, these systems and methods may update network selection(s) continuously to match application usage statistics with Access Point (AP) attributes and/or context. For example, in the case of a gaming application, systems and methods described herein may connect to an AP with lower available bandwidth but lower latency over another AP with higher available bandwidth but higher latency (subject to minimum bandwidth needed). Moreover, when multiple communication links are used, these systems and methods may adapt weights and therefore the amount of data sent through each of the communication links based upon context information (e.g., including turning off one link for low-latency use cases).

In some embodiments, systems and methods described herein may employ an adaptive algorithm based on real-time active application use information to select the best network or communication link amongst the available networks, thus improving the user's experience. For example, application data from an IHS' operating system (OS) or an optimizer application may be used to adaptively modify weights on key performance indicators (KPIs) or Quality-of-Service (QoS) indicators.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
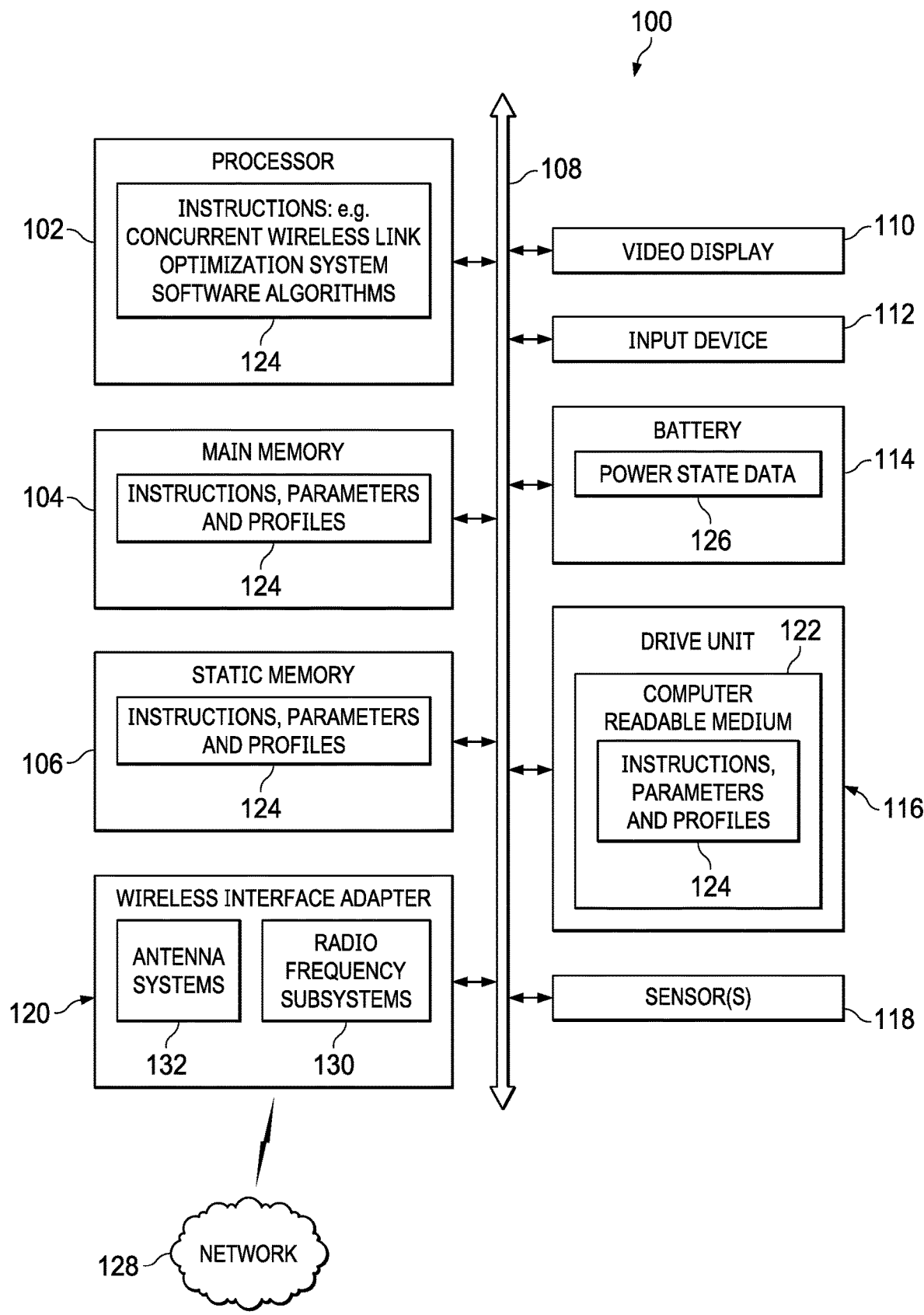
FIG. 1 is block diagram of an example of components of an Information Handling System (IHS) configured to implement adaptive network selection, according to some embodiments.

FIG. 1 is block diagram of an example of components of an Information Handling System (IHS) configured to implement adaptive network selection. In some embodiments IHS 100 may represent wireless communication devices 210, 220, and 230 or servers or systems 290 located anywhere within network 200 of FIG. 2, including remote data center 286.

Generally speaking, IHS 100 may represent a wireless communication device (e.g., a phone, a tablet, a watch, a laptop, etc.) associated with a user or recipient of intended wireless communication. A wireless communication device may execute instructions via a processor for a context aware radio resource management system including a network selection system. The context aware radio resource management system or the network selection system may operate as a software agent, in whole or in part, on a wireless communication device. IHS 100 may also represent a networked server or other system and administer aspects of the context aware radio resource management system including a network selection system via instructions executed on a processor.

As shown in FIG. 1, IHS 100 may include processor 102 such as a central processing unit (CPU), a graphics processing unit (GPU), or both. Moreover, IHS 100 can include main memory 104 and a static memory 106 that can communicate with each other via bus 108. As shown, IHS 100 may further include video display unit 110, such as a liquid crystal display (LCD), an organic light emitting diode (OLED), a flat panel display, a solid-state display, or other type of display system. Display 110 may include a touch screen display module and touch screen controller (not shown) for receiving user inputs to IHS 100. In some implementations, two displays may be coupled to each other via a hinge or the like.

Additionally, IHS 100 may include input device 112, such as a keyboard, and a cursor control device, such as a mouse or touchpad or similar peripheral input device. IHS 100 may also include a power source such battery 114 or an A/C power source. IHS 100 may also include disk drive unit 116 and sensor(s) 118. IHS 100 may include a network interface device such as wireless adapter 120. IHS 100 may also represent a server device whose resources can be shared by multiple client devices, or it can represent an individual client device, such as a desktop personal computer, a laptop computer, a tablet computer, or a mobile smartphone.

IHS 100 may include program instructions 124 that can be executed by processor 102 to cause the computer system to perform any one or more of the methods or operations disclosed herein. For example, instructions 124 may execute an adaptive network selection algorithm among a plurality of local area networks/communication links, including concurrent wireless access between local area network components or clients, software agents, or other aspects or components. Similarly, instructions 124 may establish aggregated multiple wireless links and resources within local area network access points and client.

In some cases, instructions 124 may be executed for performing adaptive network selection among one or more wireless communication bands or other communication links such as WLAN, WiGig, Ethernet or the like. Additionally, or alternatively, instructions 124 may be executed for regulating aggregated transmission or reception along wireless channels or other channels within a local area network setting selected but which may occupy nearby, both physically and in frequency, wireless link channels.

Various software modules comprising program instructions 124 may be coordinated by an OS via an application programming interface (API). Examples of OSs may include WINDOWS, ANDROID, and other OS types known in the art. Examples of APIs include, but are not limited to: Win 32, Core Java API, or Android APIs. In a further example, processor 102 may conduct monitoring and processing of wireless communication device usage trends by IHS 100.

In a networked deployment, IHS 100 may operate in the capacity of a server or as a client user computer in a server-client user network environment, or as a peer computer system in a peer-to-peer (or distributed) network environment. IHS 100 may also be implemented as or incorporated into various devices, such as a personal computer (PC), a tablet PC, a set-top box (STB), a PDA, a mobile IHS, a palmtop computer, a laptop computer, a desktop computer, a communications device, a wireless telephone, a land-line telephone, a control system, a camera, a scanner, a facsimile machine, a printer, a pager, a personal trusted device, a web appliance, an access point, a network router, switch or bridge, or any other machine capable of executing a set of instructions (sequential or otherwise) that specifies actions to be taken by that machine.

Disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. Disk drive unit 116 and static memory 106 also contain space for data storage. Further, instructions 124 may embody one or more of the methods or logic as described herein.

Wireless link quality or conditions may be monitored and measured by processor 102 during wireless link usage and stored. In a particular embodiment, instructions, parameters, and profiles 124 may reside completely, or at least partially, within main memory 104, static memory 106, and/or disk drive 116 during execution by processor 102. Main memory 104 and processor 102 may also include computer-readable media. Battery 114 may include a smart battery system that tracks and provides power state data 126. This power state data may be stored with instructions, parameters, and profiles 124.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency (RF) subsystems 130 with transmitter/receiver circuitry, wireless controller circuitry, amplifiers and other circuitry for wireless communications. Each RF subsystem 130 may communicate with one or more wireless technology protocols. RF subsystem 130 may contain individual subscriber identity module (SIM) profiles for each technology service provider and their available protocols. Alternatively, it may have a software-based SIM profile that is reconfigurable, or an eSIM for electronic control over activate SIM profile being used. Wireless adapter 120 may also include antenna system 132 which may include tunable antenna systems.

In some cases, wireless adapter 120 may operate two or more wireless communication links. For example, wireless adapter 120 may operate the two or more wireless communication links with a single, shared communication frequency band such as with the 5G standard relating to unlicensed wireless spectrum for small cell 5G next gen operation or for unlicensed Wi-Fi WLAN operation. For instance, a 5 GHz wireless communication frequency band may be apportioned under the 5G standards for communication on either small cell WWAN wireless link operation or Wi-Fi WLAN operation. In another example, wireless adapter 120 may operate a wireless communication link or links in unlicensed spectrum in 4.5G using protocols such as Licensed Assisted Access (LAA) or enhanced LAA (eLAA). In some embodiments, shared or aggregated wireless communication link(s) may be transmitted through one or a plurality of antennas.

In other cases, IHS 100 operating as a wireless communication device may operate a plurality of wireless adapters 120 for concurrent radio operation in one or more wireless communication bands. The plurality of wireless adapters 120 may further share a wireless communication band in some disclosed embodiments.

Wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. Wireless adapter 120 may represent an add-in card, wireless network interface module that is integrated with a main board of HIS 100 or integrated with another wireless network interface capability, or any combination thereof.

In an embodiment, wireless adapter 120 may include one or more RF subsystems 130 including transmitters and wireless controllers for connecting via a multitude of wireless links. IHS 100 may have an antenna system transmitter 132 for 5G small cell WWAN, Wi-Fi WLAN or WiGig connectivity and one or more additional antenna system transmitters 132 for macro-cellular communication. RF subsystems 130 include wireless controllers to manage authentication, connectivity, communications, power levels for transmission, buffering, error correction, baseband processing, and other functions of wireless adapter 120.

RF subsystems 130 of wireless adapter 120 may measure various metrics relating to wireless communication pursuant to operation of a context aware radio resource management system. For example, the wireless controller of RF subsystem 130 may manage detecting and measuring received signal strength levels, bit error rates, signal to noise ratios, latencies, packet loss, congestion, contention, jitter, and other metrics or indicators relating to signal quality and strength. In an embodiment, a wireless controller may manage one or more RF subsystems 130 within wireless adapter 120.

The wireless controller also manages transmission power levels which directly affect RF subsystem power consumption. To detect and measure power consumption by RF subsystem 130, RF subsystem 130 may implement current and voltage measurements of power.

The wireless network may have a wireless mesh architecture in accordance with mesh networks described by the wireless data communications standards or similar standards. Wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In accordance with various embodiments, a computer-readable medium may include instructions, parameters, and profiles 124 or it may receive and execute instructions, parameters, and profiles 124 responsive to a propagated signal; so that a device connected to network 128 can communicate voice, video, or data over the network 128. Further, program instructions 124 may be transmitted or received over the network 128 via the network interface device or wireless adapter 120.

IHS 100 includes one or more application programs 124, and Basic Input/Output System and firmware (BIOS/FW) code 124. BIOS/FW code 124 functions to initialize IHS 100 on power up, to launch an operating system, and to manage input and output interactions between the operating system and the other elements of IHS 100. In an embodiment, BIOS/FW code 124 reside in memory 104, and include machine-executable code that is executed by processor 102 to perform various functions of IHS 100. In another embodiment, application programs and BIOS/FW code reside in another storage medium of IHS 100. For example, application programs and BIOS/FW code can reside in drive 116, in a ROM associated with IHS 100, in an option-ROM associated with various devices of IHS 100, in storage system 107, in a storage system associated with network channel of a wireless adapter 120, in another storage medium of IHS 100, or a combination thereof. Application programs 124 and BIOS/FW code 124 can each be implemented as single programs, or as separate programs carrying out the various operations described herein.

In some embodiments, a computer-readable medium may include a solid-state memory such as a memory card or other package that houses one or more non-volatile read-only memories. Further, a computer-readable medium may be a random-access memory or other volatile re-writable memory. Additionally, a computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment.

Sensors 118 may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, angle, deformation, bending, direction, movement, velocity, rotation, acceleration, bag state (in or out of a bag), and/or lid sensor(s) (open or closed). In some cases, one or more sensors 118 may be a part of a keyboard or other input device 112. Processor 102 may be configured to process information received from sensors 118 and to perform context-based network selection operations.

For instance, during operation, the user may open, close, flip, swivel, or rotate display 110 to produce different IHS postures. In some cases, processor 102 may be configured to determine a current posture of IHS 100 using sensors 118. For example, in a dual-display IHS implementation, when a first display 110 (in a first IHS portion) is folded against a second display 110 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait). For each posture and/or hinge angle, processor(s) 201 may perform a different context-based network selection operation.

For example, in a laptop posture, a first display surface of a first display 110 may be facing the user at an obtuse angle with respect to a second display surface of a second display 110 or a physical keyboard portion. In a tablet posture, a first display 110 may be at a straight angle with respect to a second display 110 or a physical keyboard portion. And, in a book posture, a first display 110 may have its back resting against the back of a second display 110 or a physical keyboard portion.

It should be noted that the aforementioned postures, and their various respective keyboard states, are described for sake of illustration. In different embodiments, other postures may be used, for example, depending upon the type of hinge coupling the displays, the number of displays used, or other accessories.

Moreover, a different network selection operation may be performed based on other context information such as the presence or distance of the user with respect to IHS 100 and/or display 110. In these cases, processor 102 may process user presence data received by sensors 118 and may determine, for example, whether an IHS's end-user is present or absent.

In situations where the end-user is present before IHS 100, processor 102 may further determine a distance of the end-user from IHS 100 continuously or at pre-determined time intervals. The detected or calculated distances may be used by processor 102 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 110.

More generally, in various implementations, processor 102 may receive IHS context information using sensors 118 including one or more of, for example: user's presence state (e.g., present, near-field, mid-field, far-field, absent), IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user is operating the keyboard is typing with one or two hands (e.g., holding a stylus, or the like), a time of day, software application(s) under execution in focus for receiving keyboard input, etc.

In various embodiments, IHS 100 may not include all of the components shown in FIG. 1. Additionally, or alternatively, IHS 100 may include components in addition to those shown in FIG. 1. Additionally, or alternatively, components represented as discrete in FIG. 1 may be integrated with other components. For example, all or a portion of the functionality provided by the illustrated components may be implemented in a System-On-Chip (SOC), or the like.

Figure 2:
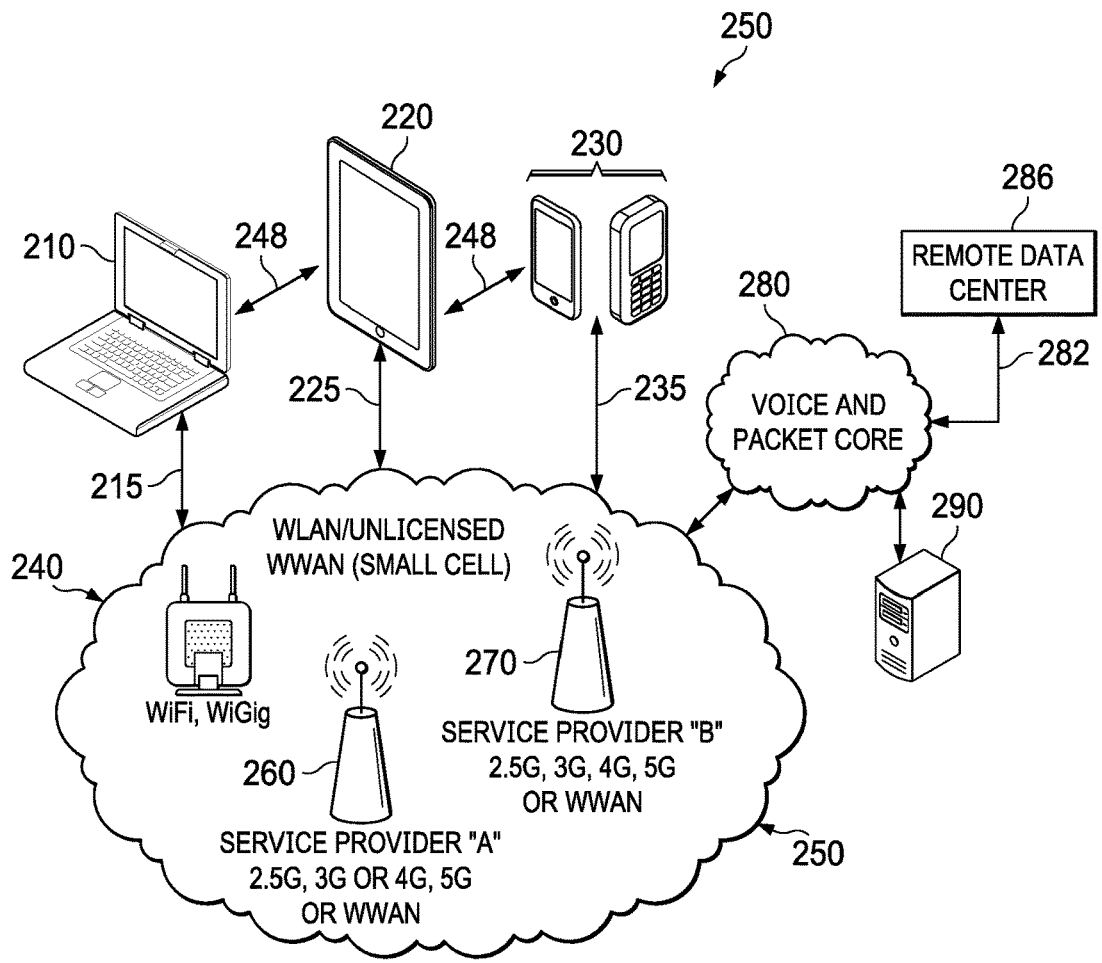
FIG. 2 is block diagram of a network environment where systems and methods for adaptive network selection may be implemented, according to some embodiments.

FIG. 2 is block diagram of a network environment where systems and methods for adaptive network selection may be implemented. In some embodiments, network 200 may include networked wireless communication devices 210, 220, and 230, wireless network access points, and multiple wireless connection link options. Network 200 may include one or more wired communication devices or links. For example, communication device 210 may include a wired link, such as an Ethernet link. A variety of additional computing resources of network 200 may include client mobile information handling systems, data processing servers 290, network storage devices, local and wide area networks, or other resources as needed or desired.

As depicted, IHSs 210, 220, and 230 may be a laptop computer, tablet computer, or smartphone device. Wireless communication devices 210, 220, and 230 may access a wireless local network 240, or they may access a macro-cellular network 250. In a further example, IHS 230, such as a laptop, may alternatively access local network 240 using a wired link, such as a wired Ethernet connection. In an example, the wireless local network 240 may be the wireless local area network (WLAN), a wireless personal area network (WPAN), or a wireless wide area network (WWAN).

In an embodiment, a standalone mobile IHS 210, 220, or 230 may operate on WLAN such as Wi-Fi or on unlicensed WWAN small cell wireless links such as with small cell unlicensed LTE substations in wireless local network 240. Components of a WLAN may be connected by wireline or Ethernet connections to a wider external network. For example, wireless network access points may be connected to a wireless network controller and an Ethernet switch. Wireless communications across wireless local area network 240 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols.

Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including small cell WWAN, WiMAX, LTE, and LTE Advanced, LTE-LAA, and the like.

In some embodiments, networked wireless communication devices 210, 220, or 230 may have a plurality of wireless network interface systems capable of transmitting simultaneously within a shared communication frequency band. Communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Examples of competing protocols may be local wireless network access protocols such as Wi-Fi, WiGig, and small cell WLAN in an unlicensed, shared communication frequency band. Examples of communication frequency bands may include unlicensed 5 GHz frequency bands or 2.5 GHz conditional shared communication frequency bands under FCC Part 96. Wi-Fi ISM frequency bands that could be subject to future sharing include 2.4 GHz, 60 GHz, 900 MHz or similar bands.

Voice and packet core network 280 may contain externally accessible computing resources and connect to a remote data center 286. Voice and packet core network 280 may contain multiple intermediate web servers or other locations with accessible data. Voice and packet core network 280 may also connect to other wireless networks similar to 240 or 250 and additional wireless communication devices such as 210, 220, 230 or similar connected to those additional wireless networks.

Connection 282 between wireless network 240 and remote data center 286 or connection to other additional wireless networks may be via Ethernet or another similar connection to the world-wide-web, a WAN, a LAN, another WLAN, or other network structure. Connection 282 may be made via a WLAN access point/Ethernet switch to the external network and be a backhaul connection.

The access point may be connected to one or more wireless access points in the WLAN before connecting directly to a wireless communication device or may connect directly to one or more wireless communication devices 210, 220, and 230. Alternatively, wireless communication devices 210, 220, and 230 may connect to the external network via base station locations at service providers such as 260 and 270. These service provider locations may be network connected via backhaul connectivity through the voice and packet core network 280.

Remote data center 286 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the wireless communication devices 210, 220, and 230 allowing streamlining and efficiency within those devices. Similarly, remote data center 286 permits fewer resources to be maintained in other parts of network 200.

In various implementations, cloud or remote data center 286 or networked server 290 may run hosted applications for systems 210, 220, and 230. For example, remote data center 286, networked server 290, or some combination of both may operate some or all of a plurality of hosted applications. Wireless communication devices 210, 220, and 230 may be configured to run one or more applications locally, and to have hosted applications run in association with the local applications at remote data center 286 or networked server 290. For example, wireless communication devices 210, 220, and 230 may operate some or all of the hosted applications on a remote server via local area network connectivity using a link aggregation system among the plurality of local area networks in some embodiments.

Thus, as illustrated, systems 210, 220, and 230 may be running applications locally while requesting data objects related to those applications from the remote data center 286 via a wireless network. For example, a data storage client application such as Microsoft Sharepoint may run on system 220, and it may be associated with a host application running at remote data center 286 that represents a Sharepoint data storage server. In another example, a web browser application may be operating at system 230, and it may request web data from a host application that represents a hosted website and associated applications running at remote data center 286.

Although 215, 225, and 235 are shown connecting wireless adapters of wireless communication devices 210, 220, and 230 to wireless networks 240 or 250, actual wireless communication may link through a wireless access point (Wi-Fi or WiGig), through unlicensed WWAN small cell base stations such as in network 240 or through a service provider tower such as that shown with service provider A 260 or service provider B 270 and in network 250.

In other cases, wireless communication devices 210, 220, and 230 may communicate intra-device via 248 when one or more of wireless communication devices 210, 220, and 230 are set to act as an access point or a WWAN connection via small cell communication or licensed small cell WWAN connections. For example, one of wireless communication devices 210, 220, and 230 may serve as a Wi-Fi hotspot.

Quality-of-Service (QoS), bandwidth, time-of-flight (e.g., following the Fine Time Measurement or "FTM" protocol), and/or speed of wireless links 215, 225, and 235—that is, a link's capabilities—may vary widely depending on several factors including the service provider, the number of wireless communication devices and users in a location, and other factors. Thus, selection of a wireless link among local area network links such as WLAN links may depend on assessment of the link radio frequency conditions. The wireless communication device's operating context can play an important role in determining wireless link conditions. Information about wireless link connection quality and capacity for a service to be used can be advantageous in optimizing communication channel selection.

Often the QoS of an end-to-end wireless communication path between wireless communication devices of a user and a recipient will most directly be affected the QoS levels at the end stages of the wireless communication path. For example, the wireless link QoS between a user wireless communication device and the wireless network on one end and the wireless link QoS between a recipient wireless communication device on the other end are often the places where communication path quality compromise, capacity limitation, or latency is most likely to occur.

Factors impacting energy consumption include switching and signaling during communication access, setup, and authentication. Additional factors that impact energy consumption include control communications, latencies, transmission/reception, and switching for the wireless link. These factors can be specific to the type of wireless service being requested, whether voice, messaging, SMTP, Audio, Video, HTTP or other service types. They can also be specific to the wireless communication device used. In each instance, radio frequency transmission subsystems and controllers operate and consume device power. Based on these, and other factors, systems and methods described herein may automatically select among communication links and/or aggregated communication links to optimize radio frequency conditions, traffic conditions, device power consumption, cost, etc.

Figure 3:
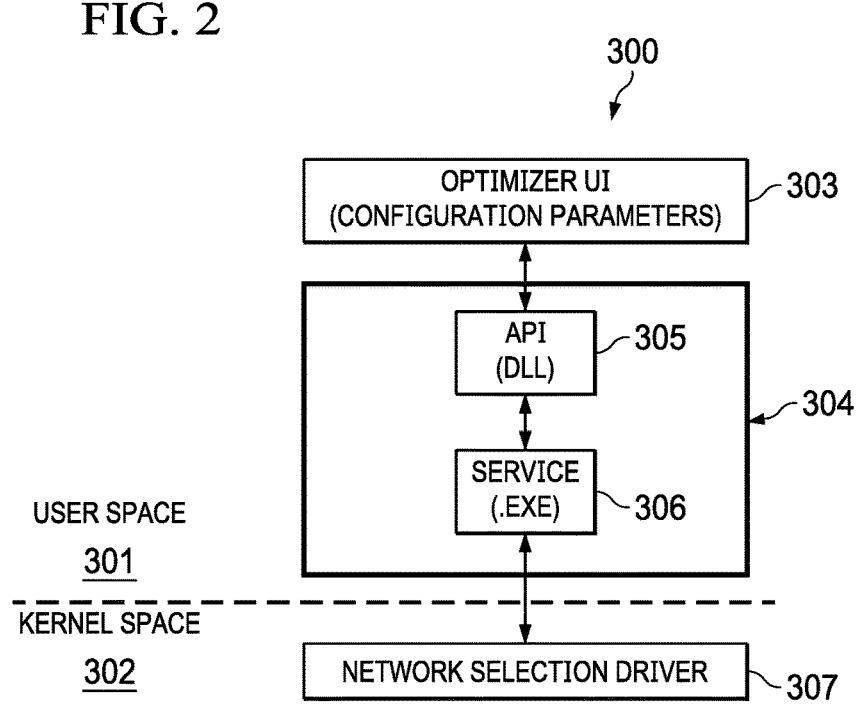
FIG. 3 is a block diagram of software modules configured to implement adaptive network selection, according to some embodiments.

FIG. 3 is a block diagram of software modules 300 configured to implement adaptive network selection. In some embodiments, software 300 may be instantiated through the execution of program instructions 124 by processor 102 of IHS 100 and configured execute method 600 shown in FIG. 6.

As shown, optimizer user interface (UI) 303 may provide a graphical UI (GUI) in user space 301 configured to receive one or more configuration parameters. For example, optimizer UI 303 may receive, as configuration parameters, a user's selection of QoS indicator(s), threshold(s), and/or context information (e.g., application type, proximity-based, posture-based, etc.), usable by software 300 to determine when to enable, disable, and/or (re)configure adaptive network selection features in IHS 100.

Optimizer UI passes configuration parameters to OS plug-in module 304, which includes API 305 (a dynamic-link library or DLL, etc.) and OS service 306 (e.g., an executable). In some implementations, OS service 306 may be configured to handle adaptive network selection operations in user space 301. In kernel space 302, callout driver 307 (e.g., Windows Filtering Platform (WFP)) may be configured to perform adaptive network selection operations under control of OS service 306, according to the configuration parameters received via optimizer UI 303.

In some implementations, software 300 may obtain real-time link requirements from running applications of various types, such as, for example, gaming, video streaming, audio conferencing, video conferencing, web browsing, etc., and it may feed real-time application data to service 306 for optimizing wireless performance or physical layer driver software 307, and to select a communication link suitable for each application. For example, software 300 may dynamically update weights (e.g., w1, w2, w3, etc.) attributed to each link requirement (e.g., latency, bandwidth or throughput, etc.) of each application at runtime, based upon context information, to produce a better user experience.

In some implementations, software 300 may include machine learning (ML) and/or artificial intelligence (AI) algorithms configured to collect context information such as, for example, RSSI from various APs, ToF from various APs, physical location information (e.g., by GPS), accelerometer data, etc. Software 300 may also include ML and/or AI algorithms configured to store and analyze other context information indicative of user behavior, such applications under execution and their priorities, distance between the user and the IHS, IHS posture or hinge angle, bag status, etc. Moreover, software 300 may be configured to use such information to perform adaptive network selection operations that are specific to that context.

Figure 4:
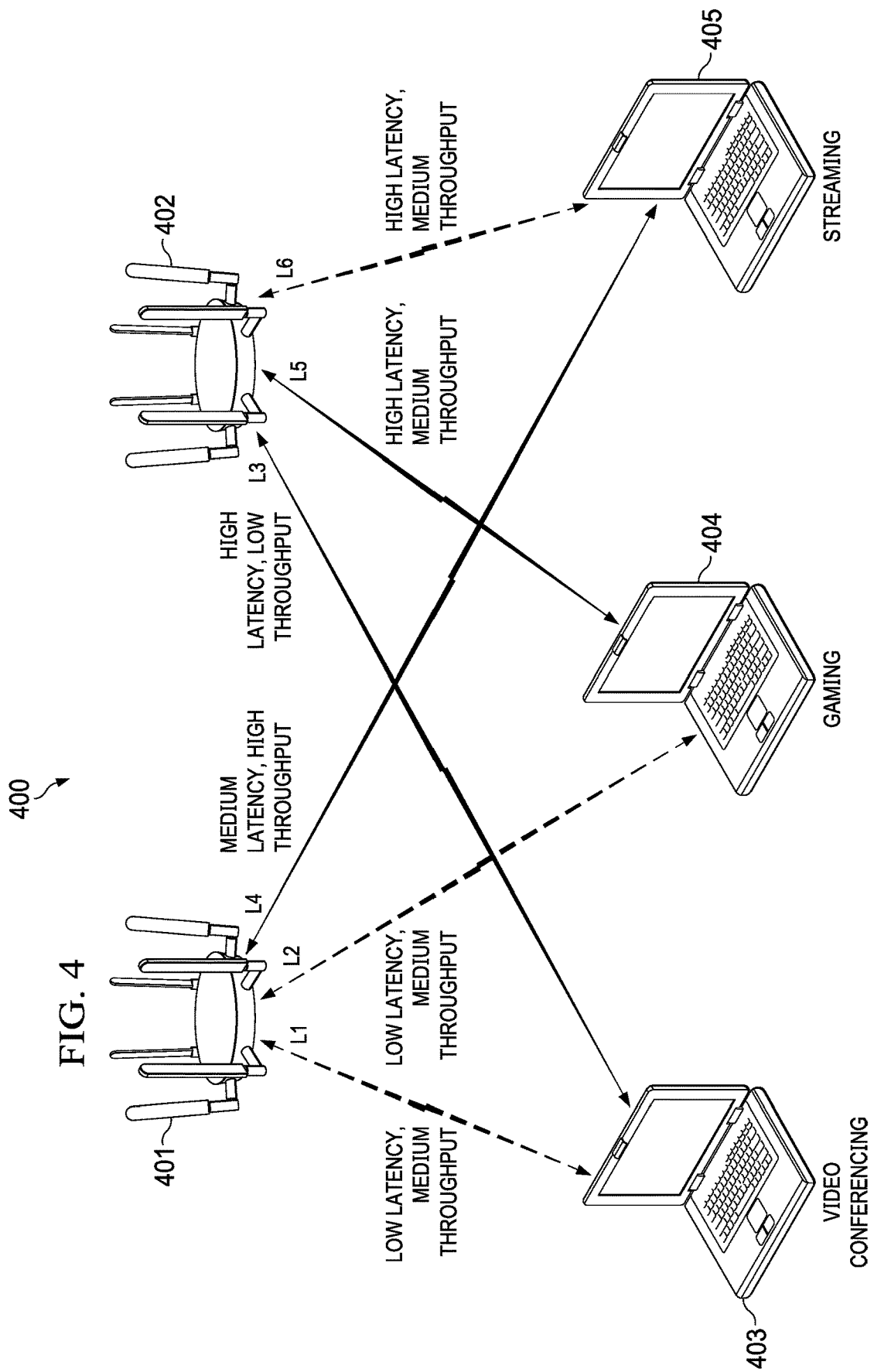
FIG. 4 is a block diagram of use-case examples, according to some embodiments.

FIG. 4 is a block diagram of use-case examples. In some embodiments, gaming and audio calls may generally require an AP with less loading, 4K video streaming may generally require an AP with high overall throughput capability, and HD video calling may generally require an AP with less loading and high throughput capability.

As an example, different link requirements for different types of applications may be as shown in Table I below:

TABLE I

| Types of Applications | |
|---|---|
| Application Type | Link Requirements |
| Gaming | Low latency, medium throughput |
| Video Streaming | Medium/high latency, high throughput |
| Audio Conferencing | Low latency, low throughput |
| Video Conferencing | Low latency, high throughput |
| Web Browsing | Medium/high latency, low throughput |

In this case, network environment 400 includes two APs 401 and 402. IHS 403 is executing a video conferencing application, IHS 404 is executing a gaming application and IHS 405 is executing a video streamlining application, each application having the link requirements of Table I. It should be noted that these link requirements may vary at runtime and may depend on context information.

Using the systems and methods described herein, IHS 404 initially connected to AP 402 via a communication link L3 having high latency and low throughput capabilities may select communication link L1 with AP 401 having low latency and medium throughput capabilities. IHS 403 initially connected to AP 402 via a communication link L5 having high latency and medium throughput capabilities may select communication link L2 with AP 401 having low latency and medium throughput capabilities. And IHS 405 initially connected to AP 401 via a communication link L4 having medium latency and high throughput capabilities may select communication link L6 with AP 402 having high latency and medium throughput capabilities.

In some cases, a combination of peer-to-peer, mesh and WLAN network interfaces may all communicate network packets of a client application to a common location outbound to an external network so that one or more network address translations are performed at one more intermediate local area network locations before communication to the external network is performed using a common aggregated network layer Internet Protocol (IP) address. Ultimately, at egress to the external network, multiple Internet Protocol addresses of the local area network are coupled by the egress device, such as an access point, by advertising the multiple Internet Protocol addresses as a single public/private Internet Protocol address.

Figure 5:
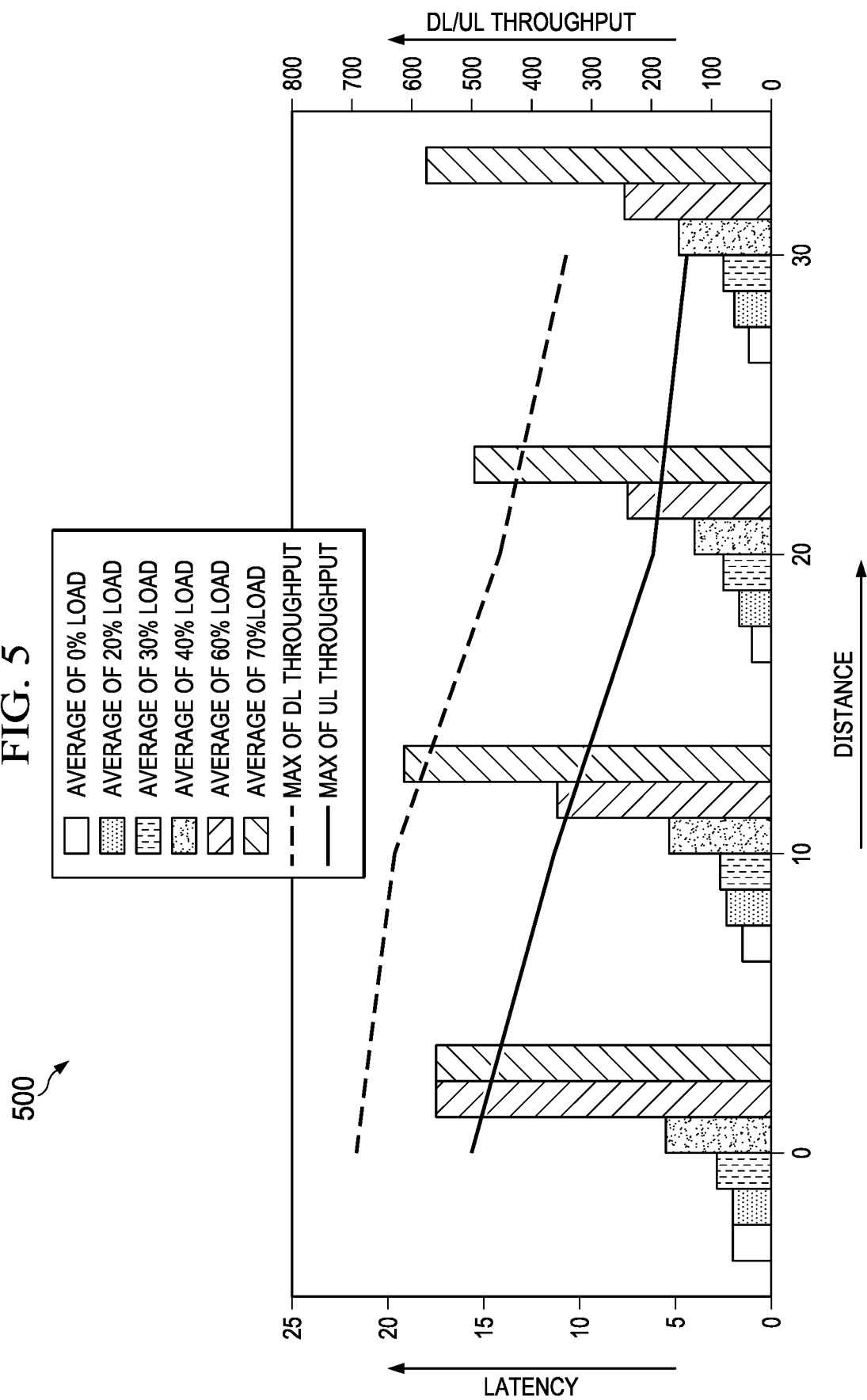
FIG. 5 shows a graph of link capabilities of an example access point (AP) at different load levels with varying distances, according to some embodiments.

FIG. 5 shows graph 500 of link capabilities of an example AP at different load levels with varying distances. In some embodiments, each access point transmits a beacon at an interval advertising its statistics about the channel conditions and loading. Graph 500 illustrates latency and throughput capabilities varying with distance and current load level of an example AP. Using this link capability information received in the AP's beacon, along with link requirements and context information obtained from software 300, method 600 below provides a mechanism to dynamically adapt and/or alter weight criteria for each parameter (e.g., link requirements or capabilities) used for AP search and/or selection algorithms.

Figure 6:
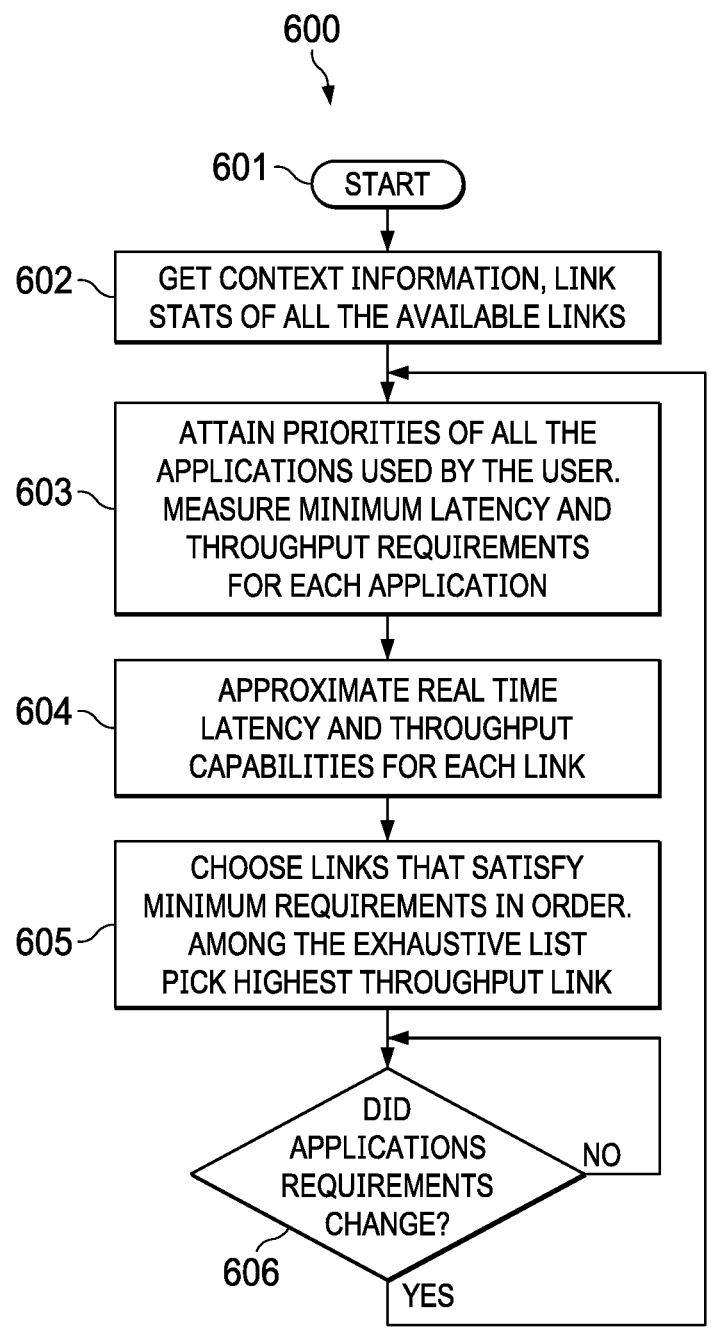
FIG. 6 is a flowchart of an example of a method for adaptive network selection, according to some embodiments.

FIG. 6 is a flowchart of an example of method 600 for adaptive network selection. In some embodiments, method 600 may be performed by IHS 100 in response to program instructions 124 being executed by processor 102. Particularly, method 600 starts at block 601. At block 602, method 600 gets context information such as, for example, an application's current link requirements, AP's current link capabilities, a user's distance from IHS, an IHS posture, a hinge angle, a bag status, etc.

In some cases, context information may be used to modify link requirements (or link capabilities). Each QoS indicator (e.g., an element of a link requirement vector) may be assigned a weight that is variable or adjustable based upon context information. For example, in response to the distance between a user and the IHS being smaller or greater than a selected value, the weight of a link requirement or capability (e.g., latency and/or throughput) may be reduced or increased. Additionally, or alternatively, in response to a hinge angle of the IHS being smaller or greater than a selected value, the weight of a link requirement or capability may be reduced or increased. Additionally, or alternatively, in response to the IHS being in a first or second posture, the weight of a link requirement or capability may be reduced or increased.

At block 603, method 600 may receive a priority indicator for all applications in execution (e.g., 1 to 5, from highest to lowest priority), for example, from the OS and/or an optimization software module. Then, at block 604, method 600 may approximate real-time latency and throughput capabilities for each communication link.

At block 605, method 600 may select communication links that satisfy or most closely match each application's link requirements, in order of priority. If two or more communication links satisfy the application's requirements, the link with highest throughput may be assigned to the application. Alternatively, the link with smallest latency may be assigned to the application.

At block 606, method 600 determines whether an application's link requirements have changed. For example, depending upon a quality of a movie being streamed at a given time, the link requirements of a video streaming application may change. Additionally, or alternatively, block 606 may identify other context changes, such as, for example: a changing distance between the user and the IHS, a changing distance between the IHS and the AP, a changing IHS posture (e.g., laptop vs. display mode), etc. Depending upon the distance between the user and the IHS and/or the IHS posture at a given time, the link requirements of an application may change. Moreover, depending upon the distance between the IHS and the AP, link capabilities may change.

To illustrate method 600, consider an example where the different capabilities of each of five communication links A-E are shown in Table II below:

TABLE II

Link Capabilities

| Links | Latency Capability | Throughput Capability |
|---|---|---|
| A | 4 ms | 100 Mbps |
| B | 10 ms | 200 Mbps |
| C | 19 ms | 450 Mbps |
| D | 500 ms | 125 Mbps |
| E | 250 ms | 178 Mbps |

For sake of this example, assume an IHS is executing two applications, and the link requirements of each application are shown in Table III below:

TABLE III

Link Requirements

| Application | Latency Requirement | Throughput Requirement |
|---|---|---|
| Video Conferencing | 25 ms | 20 Mbps |
| Media Streaming | 600 ms | 300 Mbps |

In this case, there are five communication links available to two applications. Method 600 prioritizes the video conferencing application over the media streaming application, for example, using a profile and/or look-up table (LUT) of application priorities.

First, for the higher-priority, video conferencing application, communication links A, B, and C meet or most closely match the link requirements. In this case, communication link A may be selected as having the lowest latency and/or communication link C may be selected as having the highest throughput. Moreover, depending upon the distance between the user and the IHS and/or the IHS posture, the communication link with lowest latency or highest throughput may be selected. Second, for the lower-priority, media streaming application, communication link C meets or most closely matches the link requirements. As the context changes, method 600 may adaptively choose and/or switch wireless APs based upon changing latency and bandwidth requirements.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause the IHS to:
receive link capabilities for each of a plurality of communication links available to the IHS, wherein the link capabilities comprise at least one of: a latency or a throughput capability;
receive link requirements for each of a plurality of applications executed by the IHS, wherein the link requirements comprise at least one of: a latency or a throughput requirement;
receive context information;
adjust a value of a link requirement within a subset of the link requirements based upon the context information, wherein the context information comprises a distance between a user and the IHS, and wherein to adjust the value of the link requirement the program instructions, upon execution, further cause the IHS to, in response to the distance being greater or smaller than a selected distance, change the value of the link requirement; and assign at least one of the plurality of applications to at least one of the plurality of communication links, at least in part, in response to a match between the subset of link requirements and a subset of the link capabilities.

2. The IHS of claim 1, wherein two or more of the plurality of communication links are provided by different access points.

3. The IHS of claim 1, wherein to assign at least one of the plurality of applications to at least one of the plurality of communication links, the program instructions, upon execution, further cause the IHS to:
determine that a first application has a higher priority than a second application; and
select a first one of the plurality of communication links that has first link capabilities most closely matching first link requirements of the first application prior to selecting a second one of the plurality of communication links that has second link capabilities most closely matching second link requirements of the second application.

4. The IHS of claim 3, wherein to select the first communication link, the program instructions, upon execution, further cause the IHS to determine that two or more of the plurality of communication links have latencies that satisfy a latency requirement of the first application, and wherein the first communication link is selected as one of the two or more communication links with lowest latency capability.

5. The IHS of claim 3, wherein to select the first communication link, the program instructions, upon execution, further cause the IHS to determine that two or more of the plurality of communication links have latencies that satisfy a latency requirement of the first application, and wherein the first communication link is selected as one of the two or more communication links with highest throughput capability.

6. The IHS of claim 3, wherein the program instructions, upon execution, further cause the IHS to:
detect a change in the first link requirements; and
in response to the detection, select another one of the plurality of communication links that has link capabilities most closely matching the changed link requirements.

7. The IHS of claim 3, wherein the program instructions, upon execution, further cause the IHS to:
detect a change in the first link capabilities; and
in response to the detection, select another one of the plurality of communication links that has link capabilities most closely matching the first link requirements.

8. The IHS of claim 1, wherein the context information comprises a posture of the IHS, and wherein the program instructions, upon execution, further cause the IHS to:
in response to the posture being a first posture, reduce the value of the link requirement; or
in response to the posture being a second posture, increase the value of the link requirement.

9. A memory device having program instructions stored thereon that, upon execution by a processor of an Information Handling System (IHS), cause the IHS to:
receive link capabilities for each of a plurality of communication links available to the IHS, wherein the link capabilities comprise at least one of: a latency or a throughput capability;
receive link requirements for each of a plurality of applications executed by the IHS, wherein the link requirements comprise at least one of: a latency or a throughput requirement;
in response to the IHS being in a selected posture, change a value of a link requirement within a subset of the link requirements; and
assign at least one of the plurality of applications to at least one of the plurality of communication links, at least in part, in response to a match between the subset of the link requirements and a subset of the link capabilities.

10. The memory device of claim 9, wherein the program instructions, upon execution, further cause the IHS to:
in response to a distance between a user and the IHS being smaller than a selected value, reduce a value of the link requirement; or
in response to the distance being greater than the selected value, increase the value of the link requirement.

11. The memory device of claim 9, wherein the program instructions, upon execution, further cause the IHS to:
in response to a distance between a user and the IHS being smaller than a selected value, increase a value of the link requirement; or
in response to the distance being greater than the selected value, reduce the value of the link requirement.

12. A method, comprising:
receiving link capabilities for each of a plurality of communication links available to an Information Handling System (IHS), wherein the link capabilities comprise at least one of: a latency or a throughput capability;
receiving link requirements for each of a plurality of applications executed by the IHS, wherein the link requirements comprise at least one of: a latency or a throughput requirement;
in response to a hinge angle being greater than or smaller than a selected angle, changing a value of a link requirement within a subset of the link requirements; and
assigning at least one of the plurality of applications to at least one of the plurality of communication links, at least in part, by matching the subset of the link requirements to a subset of the link capabilities.

13. The method of claim 12, further comprising, in response to a distance between a user and the IHS being smaller or greater than a selected value, changing the value of the link requirement.

* * * * *